Dec. 7, 1948.  B. ULRICH, JR  2,455,628
SNAP ACTION VALVE MECHANISM FOR EXPANSIBLE
CHAMBER MOTORS WITH OSCILLATING PISTONS
Filed Oct. 3, 1945  2 Sheets-Sheet 1

INVENTOR.
BERNHARD ULRICH, JR.
BY Cecil F Arens
ATTORNEY

INVENTOR.
BERNHARD ULRICH, JR.
BY Cecil F Arens
ATTORNEY

Patented Dec. 7, 1948

2,455,628

UNITED STATES PATENT OFFICE 2,455,628

SNAP ACTION VALVE MECHANISM FOR EXPANSIBLE CHAMBER MOTORS WITH OSCILLATING PISTONS

Bernhard Ulrich, Jr., South Bend, Ind., assignor to Bendix Aviation Corporation, South Bend, Ind., a corporation of Delaware Application October 3, 1945, Serial No. 620,087

2 Claims. (Cl. 121—97)

1

This invention relates generally to fluid-operated motors and more particularly to hydraulically actuated windshield wipers for vehicles.

An object of the invention lies in the provision of a wiper mechanism for a vehicle which may be regulated to operate at constant speed independent of the engine speed.

A further object of the invention resides in the provision of a fluid motor arranged in a hydraulic system for operating a windshield wiper.

A still further object lies in the provision of an improved hydraulically actuated motor for windshield wipers having a valve responsive to an oscillating member of the motor for reversing the direction of said motor.

Another object of the invention is to provide a fluid motor of novel construction for the actuation of a windshield wiper blade, a machine tool, or any similar part to be moved over a restricted range of movement.

Another very important object of the invention resides in the provision of a fluid actuated motor having an overcenter or snap action mechanism constructed and arranged to defer valve movement until the driven member of the fluid motor has reached its preselected positions.

The above and other objects and features of the invention will be apparent from the description of the device as illustrated in the accompanying drawings, in which.

Figure 1:
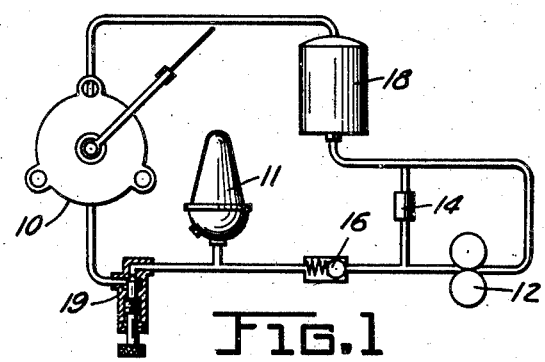
Figure 1 is a diagrammatic illustration of a hydraulic system incorporating my invention.

Referring now to Figure 1 of the drawing, the reference numeral 10 indicates the device of the invention and is connected to an accumulator 11 which stores fluid under a predetermined pressure. A pump 12 connected to a vehicle engine, not shown, puts the fluid under pressure in the accumulator so that the wiper mechanism will be capable of operation at a time when the pump is not running. An unloading valve 14, of conventional design, is connected to the pump 12 so as to by-pass fluid pressure at a time when the system pressure has reached a predetermined upper limit value. During the by-passing period the pump merely circulates the fluid through the unloading valve. A check valve 16 is connected into the system between the pump and the accumulator to prevent the leakage of the fluid from the accumulator back to reservoir 18. A valve 19 is disposed in the system between the accumulator and the wiper mechanism to control the fluid to the latter.

The fluid motor 10 includes a body or main housing 20 having a closed end 22 and an open end 24 threaded at 26 to receive an end plate or bushing 28. The closed end of the housing is drilled at 30 and 32 to form inlet and outlet ports respectively which communicate with the interior of the housing 20. A flange 34 integral with the housing at the open end thereof is drilled at 36 to receive any form of fastening means, such as bolts, not shown, for securing the fluid motor into position. The end plate 28 is drilled at 38 and 40 to accommodate a stepped shaft 42, one end of which extends into the interior of housing 20 and the other end of which protrudes exteriorly of said housing. The end plate 28 is counterbored at 44 to receive a sealing element 46 which seals the interior of the housing to atmosphere.

A valve retaining member or valve housing 48 is secured to the interior of the main housing 20 and is bored at 50 to form a bearing for that end of shaft 42 which extends interiorly of said main housing. The valve housing 48 is drilled or bored at 52 to receive a slidable valve element 54 having lands 56 and 58 which form a sliding fit with the bore 52. A passage 60 in the main housing 20 and valve housing 48, communicates the inlet 30 with the bore 52 and passages 62 and 64 in the valve housing 48. A ring-like element 66 is disposed in the housing 20 between the end plate 28 and the valve housing 48, and is held securely in place by the end plate 28 which is screwed into the main housing in abutting relationship with the ring element. The end plate 28 is grooved at 68 to receive a seal 70 to provide a liquid-tight connection between chamber 72, formed in part by the ring-like element 66, and atmosphere. The end plate 28 and valve housing 48 form end walls for the chamber 72. A block 76 is drilled at 78 and 80 to form passages registering with the passages 62 and 64 respectively for connecting the interior of the chamber 72 to the bore 52. The block is held in position by pin 82 which insures the proper alignment of the corresponding passages in the valve housing and block. The block 76 is curved at 84 to follow the contour of the shaft 42 to form a liquid-tight relationship between the block and shaft.

A vane or oscillating member 86 is disposed in the chamber 72 and is carried by the shaft 42. The vane is fixed to the shaft 42 by a bolt 88 which threadedly engages the shaft.

The end of the shaft 42 which extends interiorly of the housing 20 has a reduced end portion 90 machined at 92 to engage a mating portion 93 of a cam member 94. The cam member is provided with an arcuate rib 96, having a center of rotation coincident with the longitudinal axis of the shaft 42.

Figure 3:
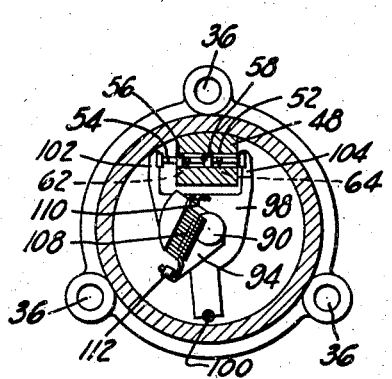
Figure 3 is a view in section taken on the lines 3—3 of Figure 2.
Figure 2:
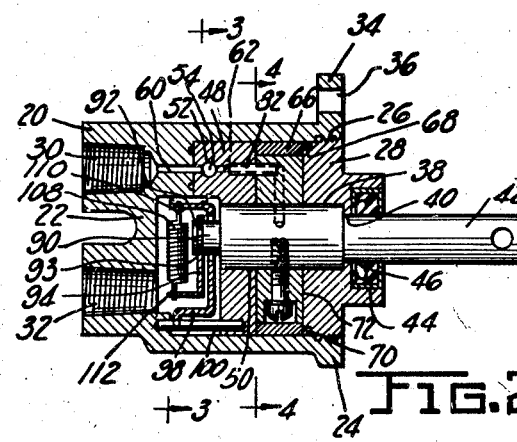
Figure 2 is a longitudinal sectional view, partly in elevation, of a fluid motor constructed in accordance with the present invention.
Figure 4:
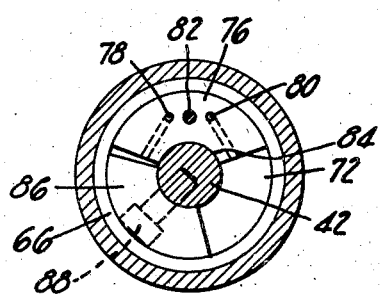
Figure 4 is a view in section taken on the lines 4—4 of Figure 2.

For changing the position of the valve 54 to control the flow of fluid to chamber 72 an actuator 98 is pivotally mounted interiorly of the housing 20 on a pin 100. The actuator includes arm-like members 102 and 104 which engage opposite ends of the valve element 54 for shifting the valve. A lug 106 integral with the actuator is arranged thereon to be engaged by the arcuate rib 96 of the cam. A spring 108 has one of its ends fixed to a tab 110 of the actuator and its other end secured to a tab 112 of the cam. This arrangement provides a snap action or overcenter control of the valve. Referring to Figure 3, it will be noted that when the tab 112 is rotated to the right or left, of a plane perpendicular to the paper and passing through points on the tabs at which the spring is attached and also through the center of rotation of the cam, the actuator arms 102 and 104 will accordingly tend to be shifted to the right or left as the case may be.

Figure 6:
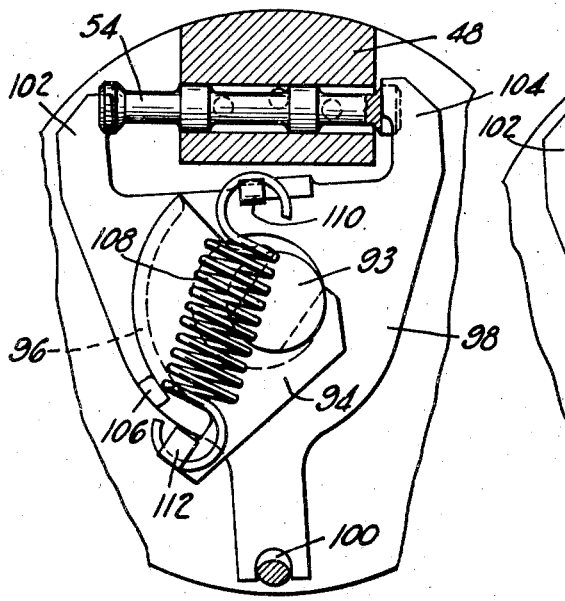
Figures 6, 7, 8 and 9 show the relationship of parts of the valve operating mechanism for various positions of the valve.
Figure 7:
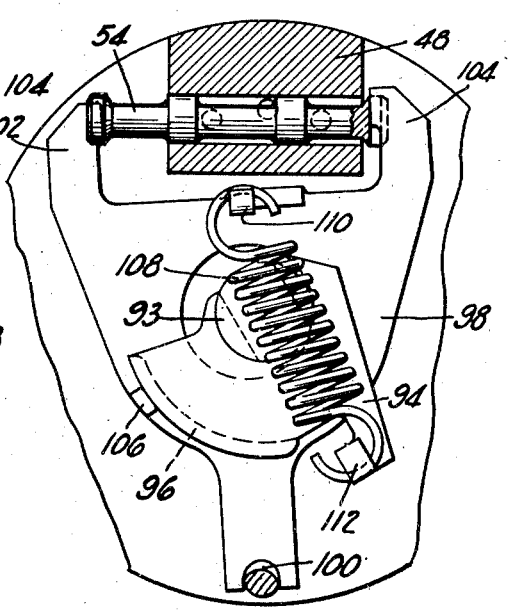
Figure 8:
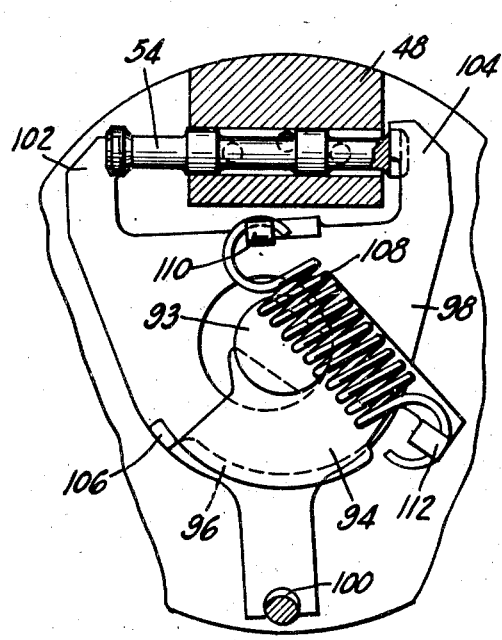
Figure 9:
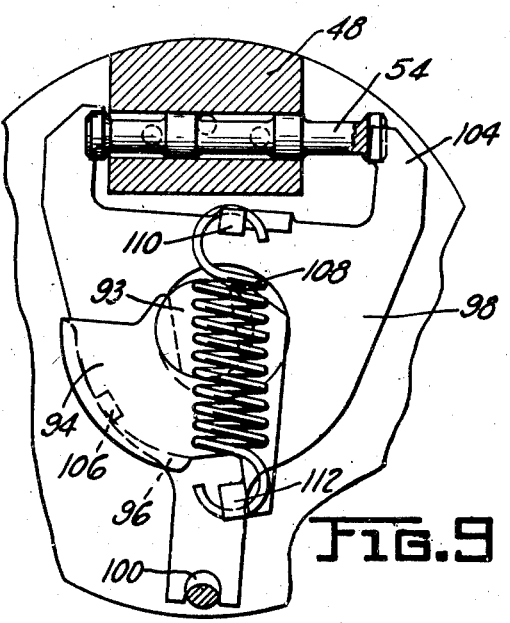

In order to defer the operation of the valve, which would otherwise be moved to the right or left as the case may be, immediately after the tab 112 is moved across center, the lug 106 is engaged by the inner or outer surface of the arcuate rib 96. This engagement of the rib by the lug 106 allows for a greater angular swing of vane 86 before reversal of the direction of the vane is achieved. As shown in Figure 6 the lug 106 is positioned with respect to the arcuate rib of the cam so that when the vane is rotated counterclockwise or to the right the outer surface of rib 106 will move into engagement with the lug before the tab 112 passes through center. The position of the actuator valve, and the relative positions of the cam and lug just after the tab 112 moves across center, are best shown in Figures 6 to 9. When the vane reaches the end of its stroke in a counterclockwise direction, as shown in Figure 3, the rib of the cam moves away from the lug, to thereby permit the spring 108 to rotate the actuator 98 to the right or clockwise, as shown in Figure 9. Rotating the actuator to the right as aforementioned carries lug 106 with it. After a reversal of direction of the vane to cause the cam to rotate in a clockwise direction or to the left, the inner surface of the rib of cam 94 engages the lug 106, as best shown in Figure 9, a predetermined time before the tab 112 crosses over center. This engagement between cam and lug as was the case in the counterclockwise rotation defers rotation of the actuator to the left until the inner surface of the cam rib has moved out of engagement with the lug 106 to thereby allow the spring to urge the actuator to the left to operate the valve element.

Figure 5:
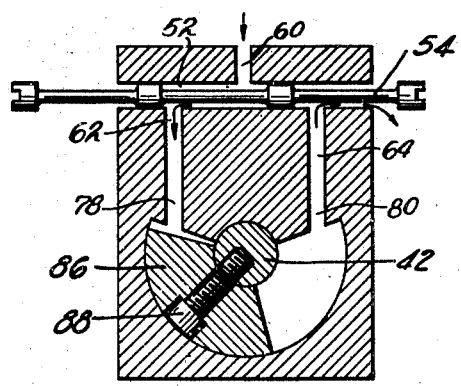
Figure 5 is a diagrammatic illustration of the fluid connections to the oscillatable member.

Operation of the device is as follows:

With the actuator rotated to the left by spring 108 as shown in Figure 3, the valve element 54 establishes communication between the inlet 30 and the left side of vane 86, through passages 60, 62 and 78 and one end of the drilled opening 52. The right side of the vane is open to exhaust or outlet 32 through the passages 80 and 64 and the other end of the drilled opening 52. The direction of flow of fluid at this time will be as shown by the arrows in the diagrammatic view of Figure 5. As soon as the vane has traveled to the end of its stroke to the right the cam 94 will move out of engagement with the lug 106 to allow the spring to rotate the actuator to the right to shift the valve 54 to the right to communicate the left side of the vane to exhaust and the right side of the vane to the inlet port. With this shift in valve position the vane will now have its right side subjected to inlet pressure and will accordingly be rotated to the left. When the vane has reached its maximum leftward movement the cam will again move out of engagement with the lug 106 to permit the spring 108 to rotate the actuator to the left to shift the valve 54 to the left to repeat the cycle of operation. The vane will continue to oscillate as long as the inlet is connected to the fluid pressure.

While I have shown and described one construction in which the invention may be advantageously embodied, it is to be understood that the construction shown has been selected merely for the purpose of illustration, and that various changes in the size, shape and arrangement of parts may be made without departing from the spirit of the invention or the scope of the subjoined claims.

What I claim as my invention is:

1. A fluid motor comprising a housing having inlet and exhaust ports therein, a shaft in the housing and carried thereby, a member located in said housing and carried by the shaft, said member being oscillatable between two preselected positions in the housing and having sides spaced apart for subjecting said member to pressure differential to cause the member to oscillate, means communicating the inlet and exhaust ports with the sides of the member and including a valve to be operated when the member reaches any one of the two preselected positions to reverse the application of the fluid pressure acting on the sides of the member to reverse said member, means for operating the valve including a cam fixed to the shaft to rotate therewith, a valve actuator pivotally carried by the housing and constructed and arranged to engage the valve to operate the same, and over-center spring means connecting the cam to the valve actuator for imparting a valve operating force to said valve actuator in response to rotation of the cam, said cam having an annular rib thereon and said valve actuator being equipped with a lug which engages with said rib during rotation of the cam to defer operation of the valve until the member has reached one of its preselected positions at which time the lug is disengaged.

2. A fluid motor comprising a housing having inlet and exhaust ports therein, a shaft in the housing and carried thereby, a member located in said housing and secured to the shaft for oscillation between two preselected positions in the housing and having sides spaced apart for subjecting said member to pressure differential to produce oscillation thereof, means communicating the inlet and exhaust ports with the sides of the member and including a valve to be operated when the member reaches any one of the two preselected positions to cause a reversal of the application of fluid pressure acting on the sides of the member to reverse the direction of said member, means for operating the valve including a cam fixed to the shaft to rotate therewith, a valve actuator pivotally positioned in the housing and operatively engaging the valve, and a single coiled spring having one end fastened to the cam and the other end secured to the valve actuator for imparting a valve operating force thereto in response to rotation of the cam, said cam having an annular rib thereon and said actuator being provided with a lug arranged for engagement with said rib during rotation of the cam to defer operation of the valve until the member has reached one of its preselected positions at which time the lug is disengaged.

BERNHARD ULRICH, Jr.

REFERENCES CITED

The following references are of record in the file of this patent:

UNITED STATES PATENTS

| Number | Name | Date |
| --- | --- | --- |
| 2,034,086 | Clima et al. | Mar. 17, 1936 |
| 2,310,750 | Schnell | Feb. 9, 1943 |

FOREIGN PATENTS

| Number | Country | Date |
| --- | --- | --- |
| 574,519 | Germany | Apr. 13, 1933 |